US010303993B2

(12) United States Patent
Lee

(10) Patent No.: US 10,303,993 B2
(45) Date of Patent: May 28, 2019

(54) WIRELESS IDENTIFICATION TAG, ELECTRONIC PRODUCT PCB HAVING SAME, AND SYSTEM FOR MANAGING ELECTRONIC PRODUCTS

(71) Applicant: NETHOM, Gyeonggi-do (KR)

(72) Inventor: Gun-Hong Lee, Seoul (KR)

(73) Assignee: NETHOM, Gyeonggi-do (KR)

( * ) Notice: Subject to any disclaimer, the term of this patent is extended or adjusted under 35 U.S.C. 154(b) by 16 days.

(21) Appl. No.: 15/471,210

(22) Filed: Mar. 28, 2017

(65) Prior Publication Data

US 2017/0200072 A1 Jul. 13, 2017

Related U.S. Application Data

(63) Continuation of application No. 14/009,229, filed as application No. PCT/KR2011/003635 on May 17, 2011, now Pat. No. 9,639,798.

(30) Foreign Application Priority Data

Apr. 7, 2011 (KR) .................. 10-2011-0032088
Apr. 25, 2011 (KR) .................. 10-2011-0038317
May 17, 2011 (KR) .................. 10-2011-0046043

(51) Int. Cl.
*G06K 19/07* (2006.01)
*G06K 19/077* (2006.01)
*G06K 19/14* (2006.01)

(52) U.S. Cl.
CPC ... *G06K 19/0723* (2013.01); *G06K 19/07758* (2013.01); *G06K 19/14* (2013.01)

(58) Field of Classification Search
USPC ................................................. 235/435, 492
See application file for complete search history.

(56) References Cited

U.S. PATENT DOCUMENTS 6,392,544 B1 * 5/2002 Collins ................ G06K 7/0008
340/10.1
7,503,505 B2 3/2009 Koyama et al.
(Continued)

FOREIGN PATENT DOCUMENTS

CN 1993703 A 7/2007
EP 1905079 A2 4/2008
(Continued)

OTHER PUBLICATIONS

European Patent Office, Search Report of EP Application No. 11862956.7, dated Mar. 20, 2015.

*Primary Examiner* — Rafferty D Kelly
(74) *Attorney, Agent, or Firm* — IP Legal Services, LLC

(57) ABSTRACT

A wireless identification (RFID) tag, an electronic product PCB having same, and an electronic product management system using the RFID tag. The RFID tag includes an insulating means, a pair of upper terminals provided on the upper surface of the insulating means, a tag chip connected to the upper terminals, and a pair of lower terminals provided on the lower surface of the insulating means so as to face the upper terminals. The lower terminals are connected to first and second patterns of an electronic product PCB. When a radio wave radiated from a reader-writer is received in the first and second patterns, reactive coupling through an electric field is created between the upper and lower terminals, which are then electrically connected to the upper terminals. Since the pattern already formed in the PCB is used as an antenna, there is no need to form a dedicated antenna pattern.

12 Claims, 12 Drawing Sheets

(56) References Cited

U.S. PATENT DOCUMENTS

| | | |
|---|---|---|
| 2004/0125040 A1* | 7/2004 | Ferguson ......... G06K 19/07749 343/895 |
| 2005/0001785 A1 | 1/2005 | Ferguson et al. |
| 2005/0035924 A1 | 2/2005 | Liu et al. |
| 2006/0170551 A1 | 8/2006 | Nakamura et al. |
| 2007/0193021 A1 | 8/2007 | Kobayashi et al. |
| 2007/0216534 A1 | 9/2007 | Ferguson et al. |
| 2008/0252425 A1 | 10/2008 | Okegawa et al. |
| 2009/0021446 A1 | 1/2009 | Kataya et al. |
| 2009/0266900 A1 | 10/2009 | Ikemoto et al. |
| 2010/0001387 A1 | 1/2010 | Kobayashi et al. |
| 2010/0140778 A1 | 6/2010 | Weekamp et al. |
| 2010/0219252 A1 | 9/2010 | Kikuchi et al. |

FOREIGN PATENT DOCUMENTS

| | | |
|---|---|---|
| KR | 10-2005-0110632 A | 11/2005 |
| KR | 10-2007-0081447 A | 8/2007 |
| KR | 10-2008-0068152 A | 7/2008 |
| KR | 10-2008-0098367 A | 11/2008 |
| KR | 10-2008-0098412 A | 11/2008 |
| KR | 10-2009-0096526 A | 9/2009 |
| KR | 10-2010-0005030 A | 1/2010 |
| KR | 10-2010-0029116 A | 3/2010 |
| WO | 2006/009934 A1 | 1/2006 |
| WO | 2007/102360 A1 | 9/2007 |

\* cited by examiner

[A-A']

WIRELESS IDENTIFICATION TAG, ELECTRONIC PRODUCT PCB HAVING SAME, AND SYSTEM FOR MANAGING ELECTRONIC PRODUCTS

CROSS REFERENCE TO RELATED APPLICATIONS

The application is a Continuation of U.S. patent application Ser. No. 14/009,229 (filed on Oct. 1, 2013), which is a National Stage Patent Application of PCT International Patent Application No. PCT/KR2011/003635 (filed on May 17, 2011) under 35 U.S.C. § 371, which claims priority to Korean Patent Application Nos. 10-2011-0032088 (filed on Apr. 7, 2011), 10-2011-0038317 (filed on Apr. 25, 2011) and 10-2011-0046043 (filed on May 17, 2011), the teachings of which are incorporated herein in their entireties by reference.

TECHNICAL FIELD

The present invention relates, in general, to a wireless identification or radio frequency identification (RFID) tag, more particularly, to an RFID tag that is used for follow-up management including management over an assembly process of a variety of electronic products, and still more particularly, to an FRID tag that does not need a separate antenna.

BACKGROUND ART

Electronic products, such as TVs, mobile phones, computers or portable music players, include at least one printed circuit board (PCB). Such PCBs are subjected to the processes of assembling and inspecting parts, such as electronic components, in a production line.

Barcode labels were used as an approach to manage the process of assembling electronic product PCBs (including the inspection process) in the related art. For instance, this method manages the entire processes including the assembly process by identifying barcodes printed on a barcode label using a scanner and updating the identified barcodes in a management server when one process is completed in the production line.

Describing the foregoing management method using barcode labels, there are restrictions in that the miniaturization of labels is limited, and that labels must be attached to positions where they can be exposed at any time to a scanner. In addition, scanning and processing time that reaches up to several tens of seconds can cause a time delay in the entire assembly process. If an electronic product PCB is small, for example, is slightly larger than or similar to the size of a label, there accompanied are troubles in that the barcode label must be detached for the purpose of the parts assembly process and be attached again when the corresponding process is finished. Therefore, the processing time must be increased. (The amount of the processing time that is uselessly spent can be estimated considering the number of assembly steps and that the assembly process is manually performed.)

In order to overcome the problem of the barcode system, several electronic product manufacturers introduced radio frequency identification (RFID) tags. As is known, the RFID tag is divided into an active tag and a passive tag depending on the presence of operating power. The active tag has limitations to miniaturization since it must include a power source (e.g. a battery). Accordingly, the passive tag which uses a radio wave radiated from an antenna of an RFID tag reader is widely used.

The passive tag basically includes a tag chip and an antenna. There are two methods of applying the passive tag to the above-mentioned electronic product PCB. One is to attach the RFID tag to the PCB like the barcode label, and the other one is to realize a passive tag in the electronic product PCB. The latter requires the electronic product PCB to be provided with an antenna pattern which is to be connected to the tag chip. This means a space corresponding to the size of the antenna is required in the PCB. It is difficult, however, to provide an antenna pattern space for the tag chip in a PCB of a small electronic product, for example, a portable phone.

RELATED ART DOCUMENT

1. Korean Laid-Open Patent Publication No. 10-2008-0098412 (published: 2008 Nov. 7.)
2. Korean Laid-Open Patent Publication No. 10-2005-0110632 (published: 2005 Nov. 23.)
3. Korean Laid-Open Patent Publication No. 10-2008-0068152 (published: 2008 Jul. 23.)
4. Korean Laid-Open Patent Publication No. 10-2010-0029116 (published: 2010 Mar. 15.)
5. WO/2007/102360 (published: 2007 Sep. 13.)
6. WO/2006/009934 (published: 2006 Jan. 26.)

DISCLOSURE

Technical Problem

Accordingly, the present invention has been made keeping in mind the above problems occurring in the prior art, and an object of the present invention is to provide a wireless identification or RFID tag which is mounted on an electronic product PCB.

Another object of the present invention is to use a DC power pattern and a ground pattern which are already formed on the electronic product PCB without separately forming an antenna for the RFID tag.

A further object of the present invention is to provide an RFID tag which is packaged for surface mounting.

Yet another object of the present invention is to provide an electronic product PCB having an RFID tag.

Still another object of the present invention is to provide an electronic product management system based on an RFID tag.

Technical Solution

The inventor recognized the possibility that patterns (a DC current pattern and ground pattern) which are already provided in an electronic product PCB may be used as an antenna of an RFID tag while inspecting the problems of the related art. The inventor defined the following objects to be solved based on the so-called theory of inventive problem solving (TRIZ or TIPS) and searched for a solution.

1. Definition of Contradiction

In the state where the RFID tag is connected (soldered) to a pattern of an electronic product PCB, the pattern acts as an antenna of the tag when power (DC power) is not supplied to the pattern. However, when power is supplied, the tag is damaged or influences the function of the electronic product PCB. In some cases, this causes the PCB to malfunction.

From this, the invention derived technical contradiction and physical contradictions as follows.

i) Technical Contradiction: "Although the RFID tag can use the pattern of an electronic product PCB as an antenna, the pattern may malfunction or be damaged when power (DC power) is applied thereto."

ii) Physical Contradiction: "The RFID tag must be connected to the pattern of the electronic product PCB and not be connected to the pattern of the electronic product PCB."

2. Search for Solution

In order to overcome the above-defined physical contradiction, the inventor devised separation in space and/or separation in condition in order to separate the RFID tag from the pattern of the electronic product PCB by applying the principle of separation in space from among the principles of separation of the TRIZ. Here, the "condition" indicates the case where DC power flows through the pattern and the case where AC power flows through the pattern.

After that, 40 principles of the TRIZ were inspected in order to overcome the technical contradiction. As major principles for developing the idea, two principles, i.e. "intermediary mediator" and "mechanical interactions substitution: use of field," were noticed. Two principles selected in this fashion were developed as follows:

i) Intermediary Mediator: "An intermediary mediator that connects the RFID tag to the pattern of the PCB is to be introduced."

ii) Mechanical Interactions Substitution: "Connection between the RFID tag and the pattern of the electronic product pattern through soldering is regarded as mechanical connection, and a means for substituting it is to be introduced."

From these principles, the inventor narrowed the range in which the solution is to be searched for, i.e. an intermediary mediator that can substitute the mechanical connection of soldering is required, and the intermediary mediator must have a selective operation function of operating at AC power (only at a radio frequency radiated from a tag reader) without operating at DC power.

Afterwards, the inventor noticed the scientific effect of reactive coupling through an electric field while searching for the more improved solution, and designed the structure of the RFID tag rendered in the Claims of this disclosure.

According to an aspect of the present invention, provided is an RFID tag that includes: an insulating means; a pair of upper terminals provided on the upper surface of the insulating means; a tag chip connected to the upper terminals; and a pair of lower terminals provided on the lower surface of the insulating means so as to face the upper terminals. The lower terminals are connected to first and second patterns of an electronic product PCB. When a radio wave radiated from a reader-writer is received in the first and second patterns, reactive coupling through an electric field may be created between the upper and lower terminals, and the first and second patterns may be electrically connected to the upper terminals. Preferably, the first pattern may be a DC power pattern, and the second pattern may be a ground pattern.

According to another aspect of the present invention, provided is an RFID tag that includes: a tag chip having a pair of inner terminals; an insulating body which contains the tag chip therein; and a pair of outer terminals provided on the insulating body so as to face the inner terminals. The pair of outer terminals may be connected to first and second patterns of an electronic product PCB. When a radio wave radiated from a reader-writer is received in the first and second patterns, reactive coupling through an electric field may be created between the inner and outer terminals, and the first and second patterns may be electrically connected to the inner terminals. Preferably, the first pattern may be a DC power pattern, and the second pattern may be a ground pattern.

According to a further aspect of the present invention, provided is an electronic product PCB including an RFID tag. The RFID tag includes: an insulating means; a pair of upper terminals provided on the upper surface of the insulating means; a tag chip connected to the upper terminals; and a pair of lower terminals provided on the lower surface of the insulating means so as to face the upper terminals. Preferably, one of the lower terminals is connected to a DC power pattern, and the other one of the lower terminals is connected to a ground pattern.

According to another aspect of the present invention, provided is an electronic product PCB including an RFID tag. The RFID tag includes: a tag chip having a pair of inner terminals; an insulating body which contains the tag chip therein; and a pair of outer terminals provided on the insulating body so as to face the inner terminals. Preferably, one of the lower terminals is connected to a DC power pattern, and the other one of the lower terminals is connected to a ground pattern.

According to yet another aspect of the present invention, provided is an electronic product PCB that includes: first and second isolating pads provided on the upper surface of the electronic product PCB; an RFID tag chip connected to the first and second isolating pads; a first lower pad extending from a DC power pattern on the lower surface of the electronic product PCB so as to face the first isolating pad; and a second lower pad extending from a ground pattern on the lower surface of the electronic product PCB so as to face the second isolating pad. Preferably, the isolating pad is not physically connected to any pattern of the electronic product PCB.

According to still another aspect of the present invention, an electronic product PCB is applied to an electronic product management system including a reader-writer.

Specific features and advantages of the present invention as well as the electronic product PCB having the above-described RFID tag and the electronic product management system based on the electronic product PCB will be described in detail as follows.

Advantageous Effects

According to the present invention, follow-up management including assembly process management over electronic product PCBs becomes easy and rapid.

In particular, since the RFID tag according to the present invention uses the DC power pattern and the ground pattern which are already formed on the electronic product PCB as an antenna, it is not necessary to form a dedicated antenna pattern on the electronic product PCB as in the related art.

MODE FOR INVENTION

Technical features of the invention will be described hereinafter in detail with respect to first and second embodiments. The term "coupling" referred to herein is divided into direct coupling and non-direct coupling. The former indicates physical coupling using soldering or the like, and the latter indicates coupling due to a field. In the following embodiments of the invention, the non-direct coupling can be referred to as reactive coupling considering that a reaction due to an electric field and an interaction is performed between terminals (e.g. upper and lower terminals). This reactive coupling is the term that comprehensively includes capacitive coupling and inductive coupling.

Figure 1:
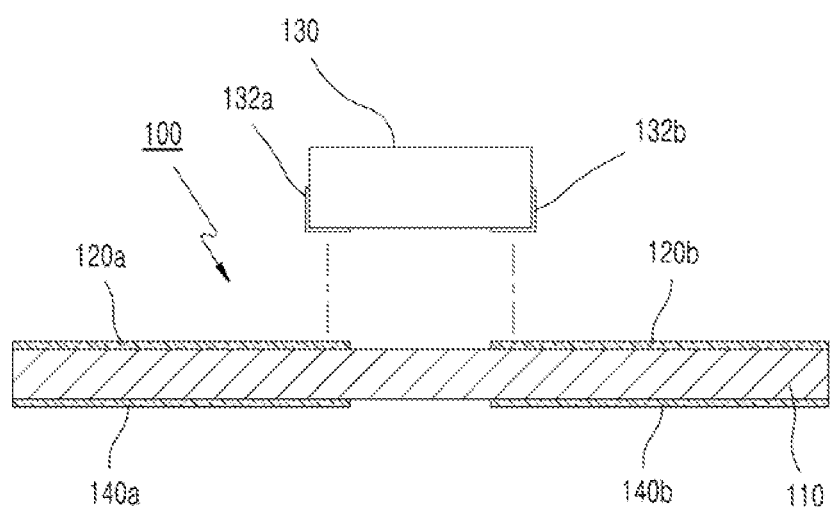
FIG. 1 is a longitudinal cross-sectional view of an RFID tag according to a first embodiment of the invention.
Figure 2:
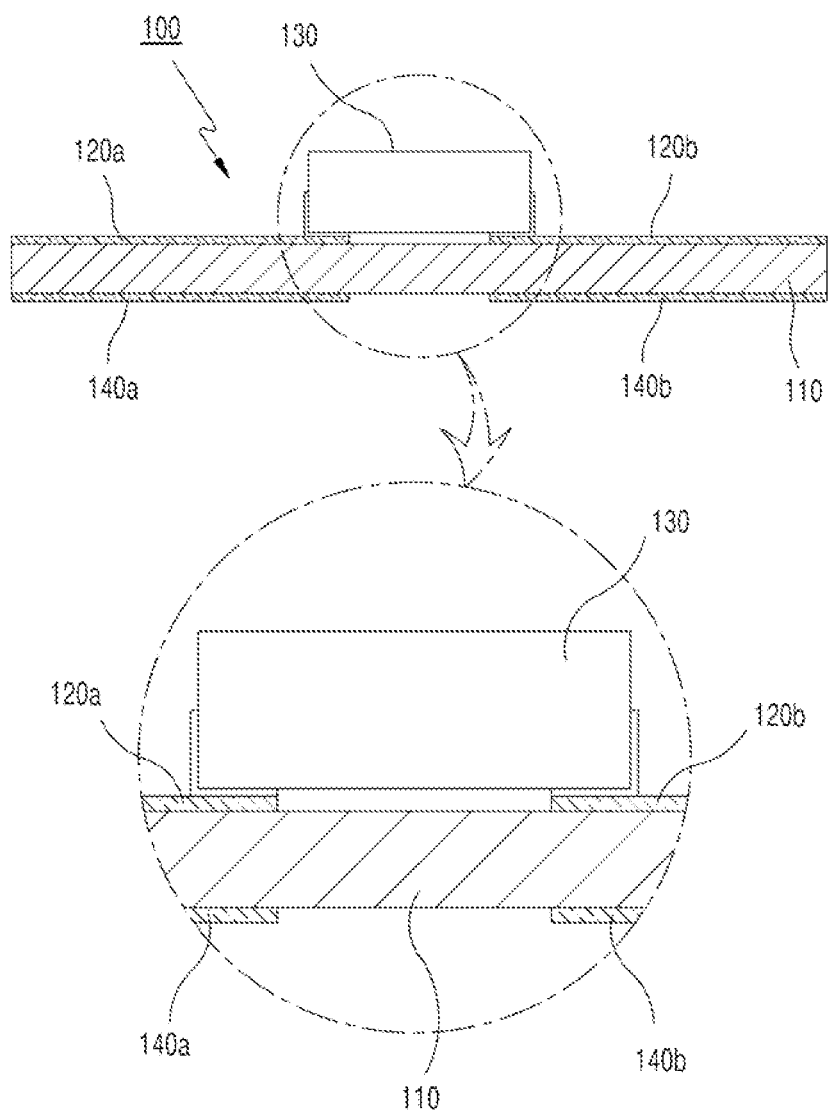
FIG. 2 is a view showing the longitudinal cross-section of the RFID tag shown in FIG. 1 and a partial enlargement thereof.

Referring to FIG. 1 and FIG. 2 in the accompanying drawings, a wireless identification or RFID tag 100 according to the first embodiment of the invention includes an insulating means 110, upper terminals 120a and 120b, a tag chip 130 and lower terminals 140a and 140b.

The insulating means 110 may be understood as a dielectric medium that has a preset level of permittivity (ε). The insulating means 110 can be made of a variety of materials, such as plastic, paper, or ceramic, with the permittivity being variable depending on the material and thickness.

Figure 3A:
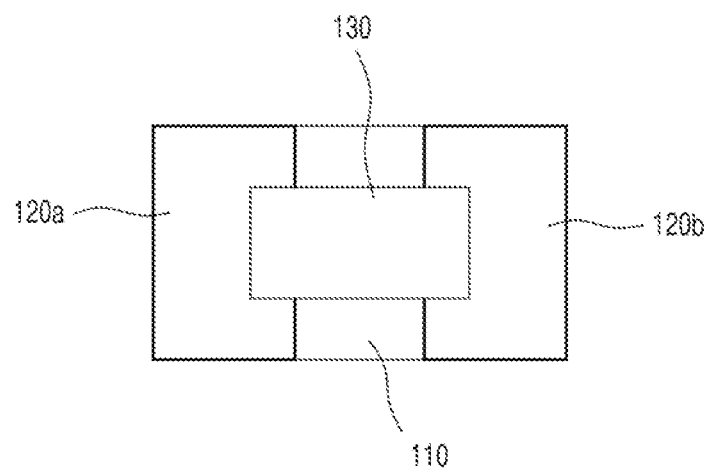
FIGS. 3A and 3B are view showing the upper surface and the lower surface of the RFID tag shown in FIG. 1.
Figure 3B:
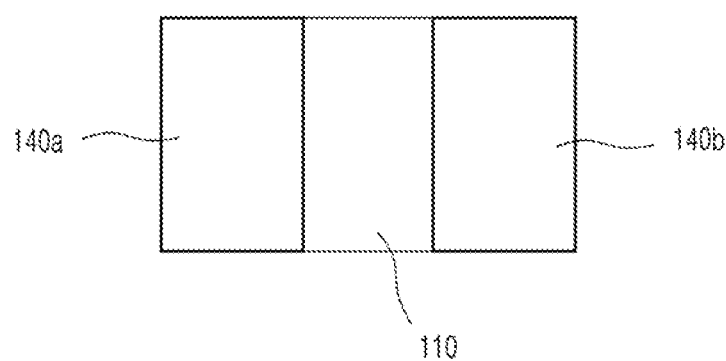

In FIG. 3A is a view showing the upper surface (upper portion) of the RFID tag 100 shown in FIG. 1, and FIG. 3B is a view showing the lower surface (bottom) of the RFID tag 100 shown in FIG. 1. A pair of the upper terminals 120a and 120b is provided on the upper surface of the insulating means 110, spaced apart from each other. The tag chip 130 is connected to the upper terminals 120a and 120b. The tag chip 130 has a pair of terminals 132a and 132b, which are respectively soldered to the upper terminals 120a and 120b. In the present invention, the tag chip 130 indicates a passive-type RFID tag from which an antenna is precluded. The tag chip 130 can be understood as an integrated circuit chip.

Figure 4:
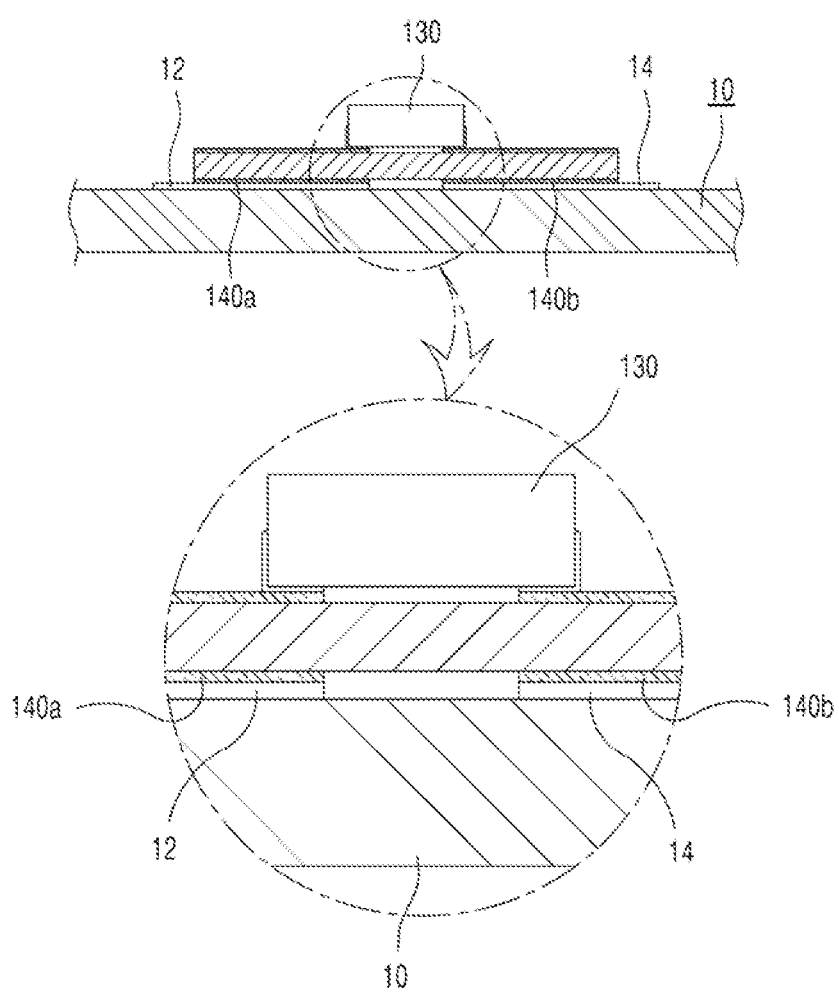
FIG. 4 is a view illustrating an aspect in which the RFID tag shown in FIG. 1 is provided in an electronic product PCB.

A pair of the lower terminals 140a and 140b that face the pair of upper terminals 120a and 120b are provided on the lower surface of the insulating means 110. As shown in FIG. 4, the lower terminals 140a and 140b are respectively connected to first and second patterns 12 and 14 formed on a PCB 10 of an electronic product through soldering or a conductive adhesive means (e.g. a conductive adhesive or a conductive adhesive sheet). In this embodiment, the first and second patterns 12 and 14 are a direct-current (DC) power pattern (e.g. VCC) and a ground pattern (e.g. GND), respectively. The DC power pattern is to provide DC power to the electronic product PCB 10. The DC power pattern may be a signal pattern formed on the electronic product PCB 10, for example, a pattern related to a switch which has low and high signal forms or a light-emitting diode (LED). Such a signal pattern may be understood as being included in the foregoing DC power pattern.

In general, the DC power pattern and the ground pattern of the electronic product PCB 10 are characterized by being distributed across the entire area of the electronic product PCB although they may differ depending on the design of the circuit and the layout of the arrangement of components. The first and second patterns 12 and 14 of the electronic product PCB 10 having these characteristics function as an antenna of the RFID tag 100 as follows.

Figure 5:
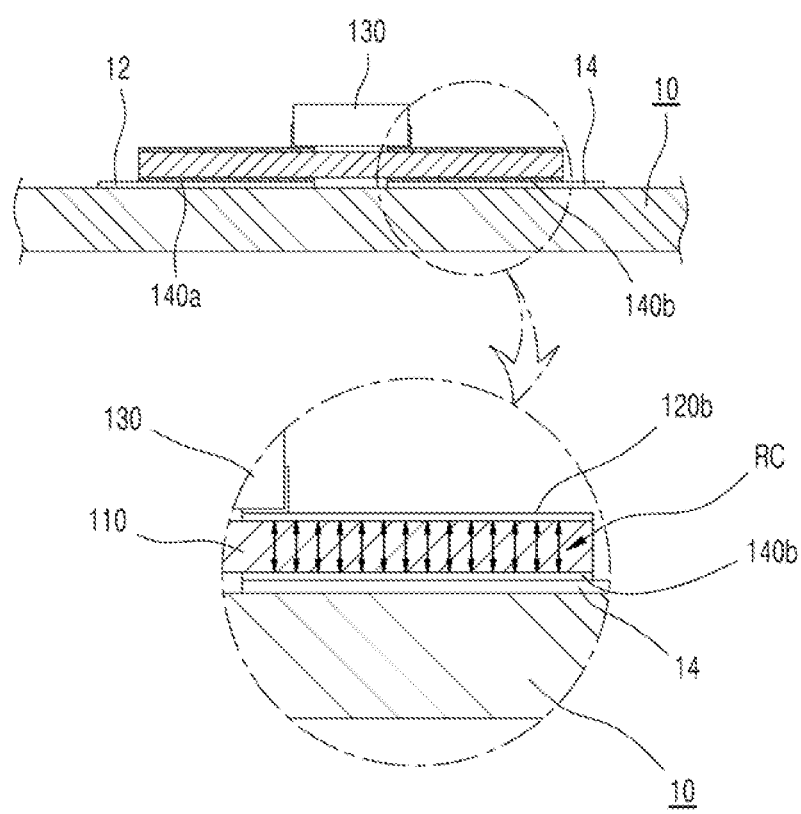
FIG. 5 is a view illustrating the operation of the RFIG tag shown in FIG. 4.

Specifically, when DC power is applied to the patterns 12 and 14, the upper terminals 120a and 120b and the lower terminals 140a and 140b stay insulated from each other due to the insulating means 110 situated between them. Therefore, the tag chip 110 does not operate. In contrast, when a preset frequency, for example, of 900 MHZ, is received from an RFID reader-writer (not shown), an electric field is formed between the upper terminals 120a and 120b and the lower terminals 140a and 140b. As shown in FIG. 5, the upper terminals 120a and 120b and the lower terminals 140a and 140b are electrically connected through reactive coupling (see reference sign "RC" in FIG. 5). Consequently, the tag chip 130 performs communication with the reader-writer like a typical RFID system.

The RFID tag 100 performs a so-called selective operation in which it does not operate in the DC power but operates only at a preset frequency of AC power.

A description will be given below of the RFID tag according to the second embodiment of the invention.

Figure 6:
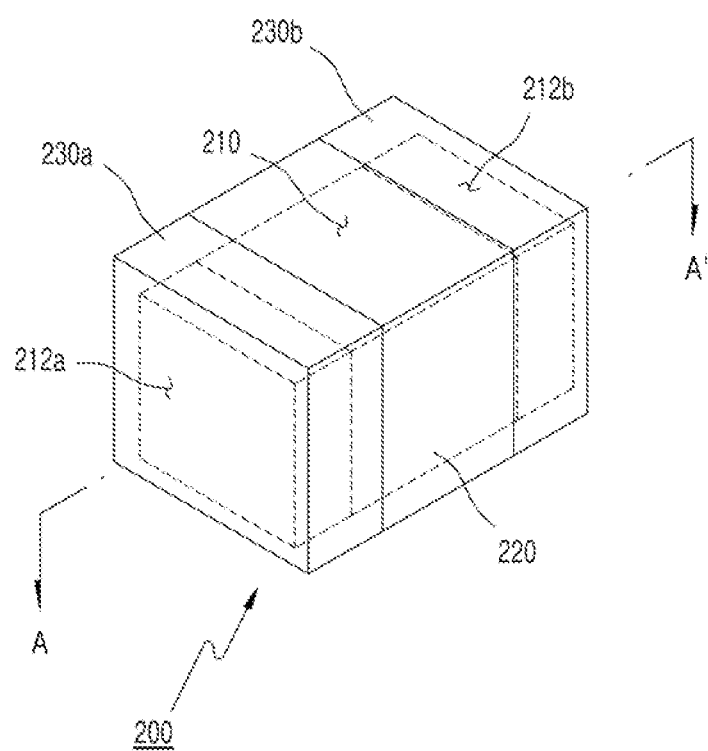
FIG. 6 is a perspective view showing an RFID tag according to a second embodiment of the invention.
Figure 7:
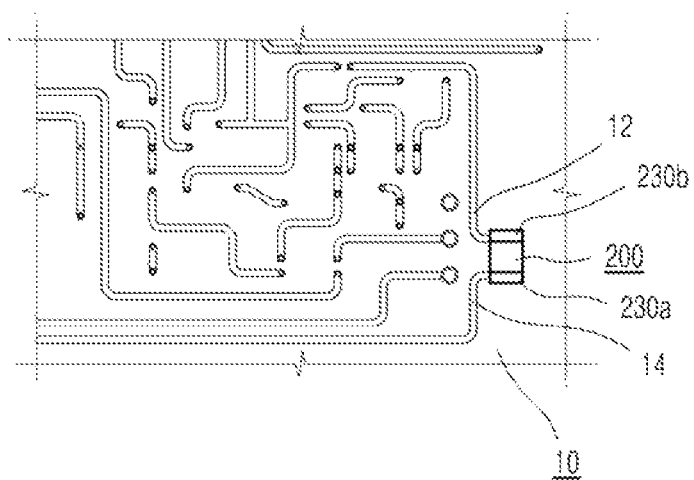
FIG. 7 is a view illustrating an aspect in which the RFID tag shown in FIG. 6 is mounted on an electronic product PCB.
Figure 8:
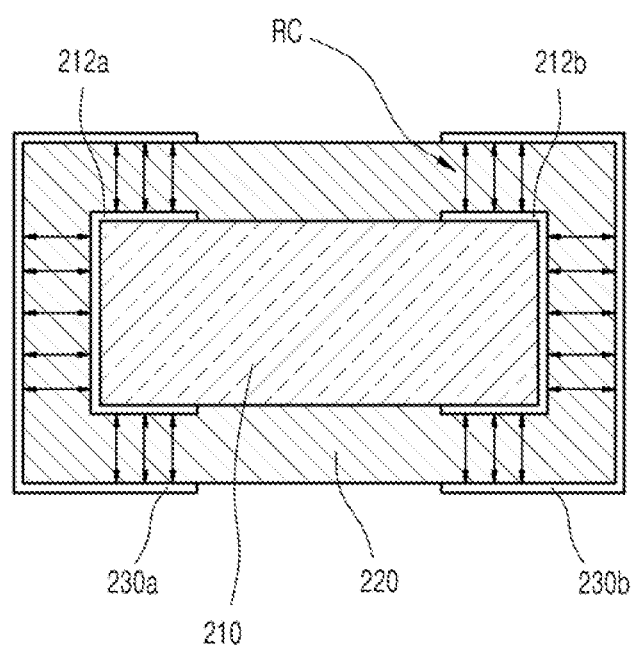
FIG. 8 is a longitudinal cross-sectional view taken along line A-A' in FIG. 6, for illustrating the operation of the RFID tag.

The RFID tag according to the second embodiment is designated with reference numeral "200" in FIG. 6 to FIG. 8. The RFID tag 200 indicates a surface-mount device (SMD) produced by standardizing the RFID tag 100 according to the first embodiment through surface mounting. For reference, of course, the RFID tag 100 according to the first embodiment also corresponds to a surface-mounting type.

Specifically, referring to FIG. 6, the RFID tag 200 includes a tag chip 210 which has defined therein inner terminals 212a and 212b, an insulating body 220 which contains the tag chip 210 therein, and a pair of outer terminals 230a and 230b which are provided on the outer portions of the insulating body so as to face the inner terminals 212a and 212b.

Although the insulating body 220 can be made of the materials of the insulating body 110 according to the first embodiment, the present invention is not limited to those materials. The outer terminals 230a and 230b of the RFID tag 200 are soldered to first and second patterns 12 and 14 of an electronic product PCB 10, as shown in FIG. 7. When DC power is applied to the patterns 12 and 14 in this state, the tag chip 210 does not operate. However, when a radio wave having a preset frequency (e.g. 900 MHz) is received in the patterns 12 and 14, as shown in FIG. 8, the outer terminals 230a and 230b and the inner terminals 212a and 212b are electrically connected through reactive coupling (RC), so that the tag chip 210 operates.

That is, the RFID tag 200 according to the second embodiment performs a selective operation like the above-described RFID tag 100 according to the first embodiment.

In addition, the inventor carried out an experiment on the RFID tag 200 according to the second embodiment. Resources for the experiment are presented in Table 1 below.

TABLE 1

| | |
|---|---|
| Electronic product | Portable phone from Samsung Electronics Co. Ltd. (Product name: "SCH-M715") |
| RFID tag | Operating frequency: 900 MHz<br>DC power pattern and ground pattern extending from battery connection terminal of portable phone PCB are soldered |
| Reader-writer | Operating frequency: 900 MHz<br>External antenna |
| PC | Tag recognizing dedicated software<br>Connected to reader-writer |
| Experimental condition | 1. In the state where case of portable phone is removed<br>2. In the state where case of portable phone is included |

In experimental condition 1, when the external antenna was moved close to the portable phone PCB, the tag was normally recognized. In experimental condition 2, it was also confirmed that the tag was normally recognized when the external antenna was moved close to the portable phone PCB. The distance of recognition was approximately from 3 to 4 cm.

The inventor carried out an experiment on a plurality of portable phones which are commercially distributed in Korea in addition to the portable phone "SCH-M715" presented in Table 1, and confirmed that they normally operated. Of course, the same results were obtained from an experiment on laptop computers including portable multimedia devices (e.g. a PMP or MP3 player) in addition to portable phones.

Figure 9:
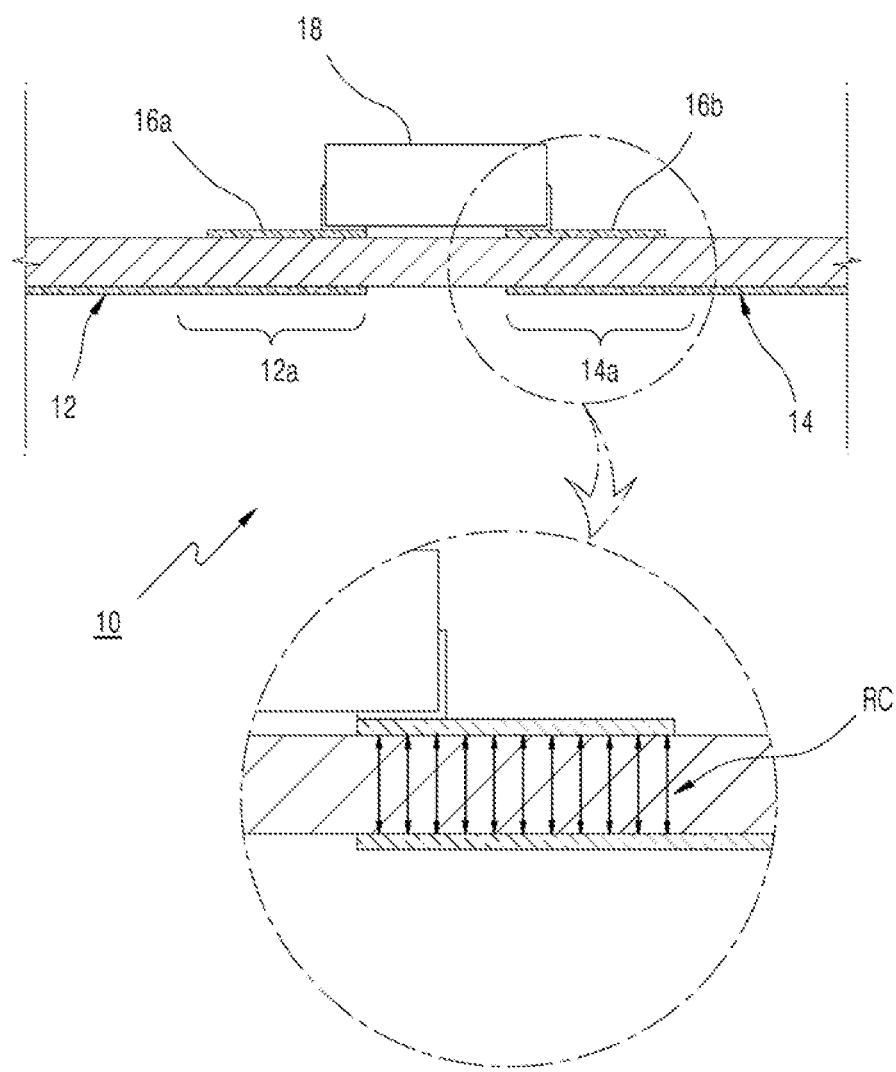
FIG. 9 and FIG. 10 are views illustrating an electronic product PCB according to a third embodiment of the invention.
Figure 10:
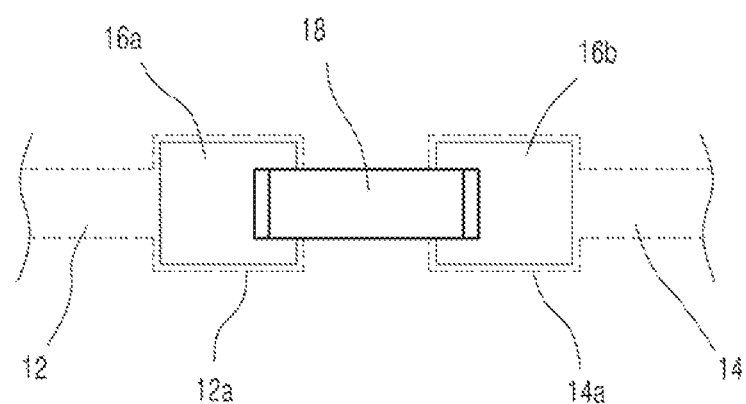

FIG. 9 and FIG. 10 are views illustrating an electronic product PCB 10 according to a third embodiment of the invention.

Referring to the figures, a first isolating pad 16a and a second isolating pad 16b are provided on the upper surface of the electronic product PCB 10 such that the first and second isolating pads 16a and 16b are spaced apart from each other at a preset distance. Herein, the term "isolating" indicates the state in which each of the pads 16a and 16b is not physically connected to any pattern (the power pattern, ground pattern or signal pattern) formed on the electronic product PCB. A tag chip 18 is connected to the isolating pads 16a and 16b.

First and second lower pads 12a and 14b are provided on the lower surface of the electronic product PCB 10. The first lower pad 12a extends from the first pattern 12 so as to face the first isolating pad 16a, and the second lower pad 14b extends from the second pattern 14 so as to face the second isolating pad 16b. Preferably, the first pattern 12 is a DC power pattern, and the second pattern 14 is a ground pattern.

When DC power is applied to the patterns 12 and 14 of the electronic product PCB 10 according to the third embodiment, the tag chip 18 does not operate. However, when a radio wave having a preset frequency (e.g. 900 MHz) is received, the isolating pads 16a and 16b and the lower pads 12a and 14b are electrically connected through reactive coupling (RC). Consequently, the tag chip 18 operates. That is, the first pattern 12 and the second pattern 14 function as the antenna of the tag chip 18.

This embodiment is characterized in that the reactive coupling function and structure described in the first and second embodiments are realized in the electronic product PCB 10.

The above-described RFID tags 100 and 200 according to the first and second embodiments and the electronic product PCB 10 according to the third embodiment can be used for assembly process management over a variety of electronic products and follow-up management such as repair or warranty service (A/S). In this specification, the assembly process management and the follow-up management are collectively referred to as "electronic product management." Specifically, FIG. 11 shows an example of the structure of an electronic product management system S.

Figure 11:
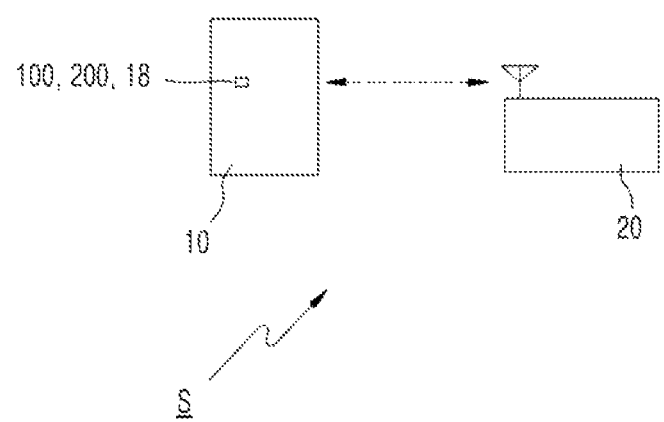
FIG. 11 to FIG. 14 are views illustrating electronic product management systems which are constructed based on an electronic product PCB according to the invention.

As shown in FIG. 11, the electronic product management system S basically includes an electronic product PCB 10 which is provided with the RFID tag 100 or 200 or the tag chip 18 and at least one reader-writer 20.

The reader-writer 20 can read out or correct information (e.g. identification information) stored in the tag chip 130, 210 or 18 and record added information in the tag chip through radio communication using a frequency of 900 MHz.

Figure 12:
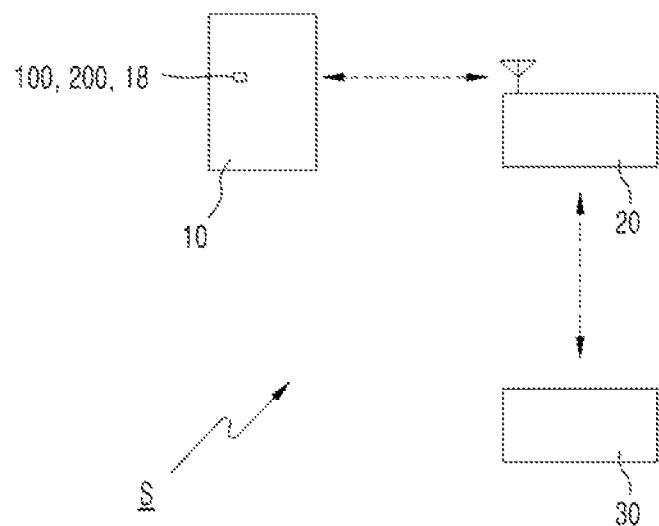
Figure 13:
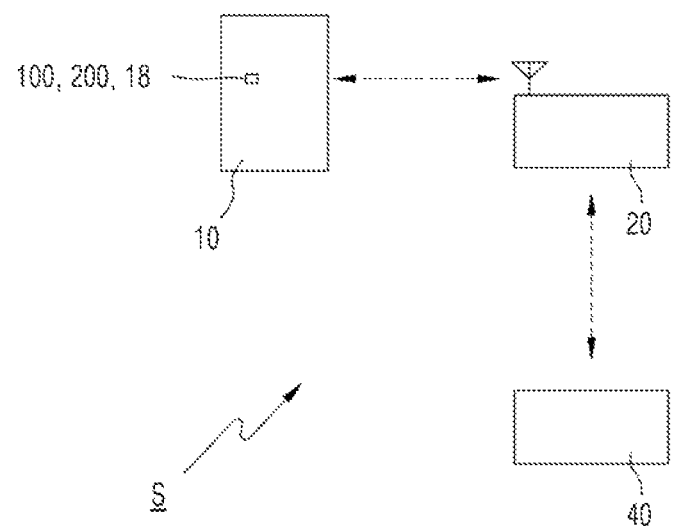
Figure 14:
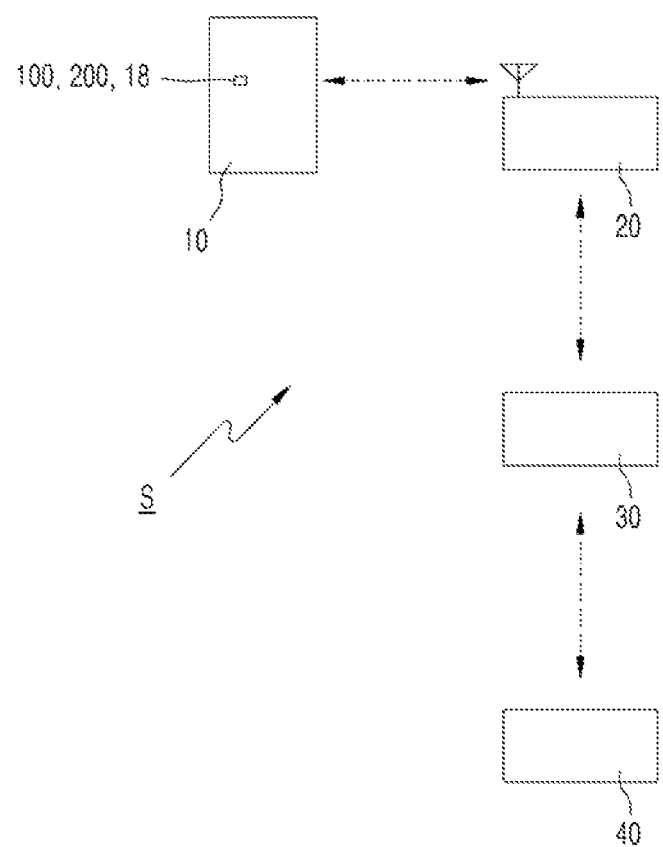

The reader-writer 20 can be connected to a user computer 30 through a wired network or wireless network, as shown in FIG. 12, and to a server 40, as shown in FIG. 13. Alternatively, as shown in FIG. 14, the system can be configured such that the reader-writer 20 is connected to the computer 30, which is connected to the server 40. Here, the server 40 can be a management server or a database management system (DBMS) which manages information related to electronic products.

Although the embodiments of the present invention have been disclosed for illustrative purposes, the present invention is not limited to the construction and operation that is shown in the drawings and has been disclosed above, so those skilled in the art will appreciate that various modifications, additions and substitutions are possible, without departing from the scope and spirit of the invention as disclosed in the accompanying claims.

INDUSTRIAL APPLICABILITY

The present invention is applicable to RFID tags which are used for assembly process management over a variety of electronic product PCBs or electronic products as well as to follow-up management such as repair or warranty service (A/S).

The invention claimed is:

1. An electronic product PCB (Printed Circuit Board) comprising:
   a PCB portion including a DC power pattern and a ground pattern;
   first and second isolated upper pads provided on an upper surface of the PCB portion;
   an RFID tag chip connected to the first and second isolated upper pads;
   a first lower pad extending from the DC power pattern on a lower surface of the PCB portion to face the first isolated upper pad; and
   a second lower pad extending from the ground pattern on the lower surface of the PCB portion to face the second isolated upper pad,
   wherein the PCB portion is positioned between the isolated upper pads and the lower pads such that (i) DC power applied to the DC power pattern and the ground pattern connected to the lower pads is not transferred to the RFID tag chip through the isolated upper pads and (ii) a radio wave received or to be transmitted by the DC power pattern and the ground pattern is transferred between the lower pads and the isolated upper pads through an electrical coupling.

2. The electronic product PCB according to claim 1, wherein the isolated upper pads are physically unconnected to any pattern of the PCB portion.

3. The electronic product PCB according to claim 2, wherein the isolated upper pads are physically unconnected to the DC power pattern, the ground pattern, and a signal pattern of the PCB portion.

4. The electronic product PCB according to claim 1, wherein, when a radio wave radiated from a reader-writer is received in the DC power and ground patterns, a reactive coupling through an electric field is created between the isolated upper pads and the lower pads.

5. The electronic product PCB according to claim 1, wherein the first and second isolated upper pads are spaced apart from each other at a preset distance.

6. The electronic product PCB according to claim 1, wherein the isolated upper pads and the lower pads are arranged to at least partially face each other such that the electrical coupling is formed between the lower pads and the isolated upper pads.

7. An electronic product PCB (Printed Circuit Board) comprising:
 a PCB portion including a DC power pattern and a ground pattern;
 first and second isolated upper pads to be connected to an RFID tag chip, wherein the first and second isolated upper pads are provided on an upper surface of the PCB portion;
 a first lower pad extending from the DC power pattern on a lower surface of the PCB portion to face the first isolated upper pad; and
 a second lower pad extending from the ground pattern on the lower surface of the PCB portion to face the second isolated upper pad,
 wherein the PCB portion is positioned between the isolated upper pads and the lower pads such that (i) DC power applied to the DC power pattern and the ground pattern connected to the lower pads is not transferred to the RFID tag chip through the isolated upper pads and (ii) a radio wave received or to be transmitted by the DC power pattern and the ground pattern is transferred between the lower pads and the isolated upper pads through an electrical coupling.

8. The electronic product PCB according to claim 7, wherein the isolated upper pads are physically unconnected to any pattern of the PCB portion.

9. The electronic product PCB according to claim 8, wherein the isolated upper pads are physically unconnected to the DC power pattern, the ground pattern, and a signal pattern of the PCB portion.

10. The electronic product PCB according to claim 7, wherein, when a radio wave radiated from a reader-writer is received in the DC power and ground patterns, a reactive coupling through an electric field is created between the isolated upper pads and the lower pads.

11. The electronic product PCB according to claim 7, wherein the first and second isolated upper pads are spaced apart from each other at a preset distance.

12. The electronic product PCB according to claim 7, wherein the isolated upper pads and the lower pads are arranged to at least partially face each other such that the electrical coupling is formed between the lower pads and the isolated upper pads.

\* \* \* \* \*